3,124,611
OXIDATION OF AROMATIC COMPOUNDS
Alan John Shipman, Northwich, England, assignor to Imperial Chemical Industries Limited, London, England, a corporation of Great Britain
No Drawing. Filed Apr. 21, 1961, Ser. No. 104,541
Claims priority, application Great Britain May 3, 1960
5 Claims. (Cl. 260—524)

This invention relates to a novel process for oxidising substituted aromatic compounds to give the corresponding carboxylic acids.

Several methods are known for oxidising side-chains of substituted aromatic compounds. One of the commonest is to subject the compound to the action of air or oxygen in the vapour phase at relatively high temperatures in the presence of a finely divided metal or metal oxide or other heterogeneous catalyst. Other methods are performed in solution using conventional oxidising agents such as nitric acid, dichromates, permanganates.

It has now been found that under the influence of high pressures and elevated temperatures sulphur dioxide can oxidise alkyl and substituted alkyl and unsaturated side chains of aromatic compounds to give good yields of the corresponding carboxylic acids.

According to this invention there is provided a process for making aromatic carboxylic acids comprising subjecting a mixture of sulphur dioxide and an aromatic compound having one or more oxidisable side-chains to the action of superatmospheric pressure and elevated temperature.

The oxidation can be carried out over a wide range of pressures for example 50–2500 atmospheres, and over a temperature range of 200°–400° C., but the conditions that give the preferred compromise between high reaction rate and high yield, the reaction rate being over some parts of the pressure range inversely proportional to the pressure in the presence of a constant proportion of aromatic compound, are pressures of 100–400 atmospheres and temperatures of 250°–350° C. For example, under conditions that give a fast reaction rate when p-xylene is undergoing oxidation namely temperatures of 275°–300° C. and pressures of 100–200 atmospheres, and an excess of p-xylene, yields of up to 95% of terephthalic acid may be obtained, but if the reaction rate be slowed by increasing the pressure to 300–400 atmospheres and the temperature to 300°–350° C. appreciable amounts of p-toluic acid are formed as well as terephthalic acid.

The reaction does not appear to be catalysed by free-radical initiators, nor to be retarded by inhibitors of free-radicals such as nitric oxide and p-benzoquinone. It is however completely inhibited by metallic silver and copper, but not by iron, nickel, chromium and mercury, and these effects need to be considered when designing apparatus and plant in which to carry out the reaction. The reaction rate appears to be inversely proportional to the ratio of the surface-area of the reaction vessel to its volume, and where this ratio is high the reaction may have an induction period of several hours. Reaction times are conveniently of the order of 1 to 6 hours.

The sulfur dioxide used in the reaction is reduced to elementary sulphur which may if desired be recovered. When the reaction product is benzoic acid, for example, the liquid layers of acid and sulphur separate out and solidify with very little intermingling, so that the sulphur can be removed and re-oxidised without purification, and recrystallisation of the acid is not affected by sulphur.

The oxidisable side-chain may be an alkyl group as for example in toluene and xylene, or a substituted alkyl group as for example alkyl subsituted with chlorine, hydroxy or oxygen as in benzyl chloride, benzyl alcohol, benzylaldehyde; or it may be an unsaturated group as in styrene. The aromatic nucleus may be from benzene, naphthalene or anthracene, and may contain substituents that are inert to oxidation such as halogens and nitrogroups as well as containing oxidisable side-chains, for example as in p-chlorobenzaldehyde. If the aromatic nucleus contains more than one oxidisable side-chain it is possible by adjustment of the reaction conditions to oxidise them one by one.

It is generally assumed that the oxidation of an alkyl group attached to an aromatic nucleus proceeds via the aldehyde. Except with benzyl alcohol, which on oxidation under relatively mild conditions gave a small amount of benzaldehyde with the main product benzoic acid, aldehydes have not been detected in significant amounts among the reaction products. One reason for this may be that the aldehydes are oxidised to acids at much faster rates than they themselves are formed. For example, it has been shown that the rate of oxidation of toluene to benzoic acid is only about one tenth of the rate of oxidation of benzaldehyde to benzoic acid under comparable conditions of temperature and pressure.

The invention is illustrated but not restricted by the following examples.

Example 1

300 ml. (260 g.) of toluene was placed in a 1 litre capacity high-pressure vessel fitted with a liner of 18.8.1 stainless steel and heated at 300° C. under a pressure of 300 atm. of sulphur dioxide for 2 hours. The fall in pressure during the reaction was periodically compensated by the addition of more sulphur dioxide. When the reaction was complete 469 g. of dry solid product and 40 g. of water were recovered from the reaction vessel. By recrystallisation from water 306 g. of benzoic acid was obtained corresponding to a yield of 89%, calculated on the toluene used.

Example 2

280 ml. (241 g.) of p-xylene was heated in a 1 litre capacity high-pressure vessel at 310° under a pressure of 140 atm. of sulphur dioxide for 1 hour. The pressure was maintained during the reaction by the addition of fresh sulphur dioxide. When the reaction was complete, 586 g. of dry solid product and 69 g. of water were recovered from the reactor. By solution in dilute caustic soda solution and acidification with dilute hydrochloric acid 352 g. of terephthalic acid was obtained corresponding to a yield of 93% (calculated on p-xylene used).

Example 3

400 ml. (344 g.) of m-xylene was heated with excess sulphur dioxide at 275° and 300 atm. for 2 hours; 495 g. of isophthalic acid was obtained corresponding to a yield of 92% (calculated on m-xylene used).

Example 4

260 ml. (222 g.) of p-xylene were heated at 250° C. under 300 atm. of sulphur dioxide for 10 hours. The product contained 80 g. of p-toluic acid and 250 g. terephthalic acid corresponding to yields of 28% and 72% respectively.

Example 5 o-Xylene was oxidised by sulphur dioxide in 3 hours to phthalic acid at 300° C. and 300 atm. pressure in 90% yield.

Example 6

Pseudocumene (1,2,4 trimethyl benzene) was oxidised by sulphur dioxide in 4 hours to trimellitic acid at 300° C. and 300 atm. in 90% yield.

Example 7

Benzaldehyde was oxidised by sulphuric dioxide in 1 hour to benzoic acid at 300° C. and 600 atm. in 93% yield.

Example 8 p-Chlorobenzaldehyde was oxidised by sulphur dioxide in 2 hours to p-chlorobenzoic acid at 275°C. and 300 atm. pressure in 80% yield.

Example 9

Bibenzyl was oxidised by sulphur dioxide in 6 hours to benzoic acid at 300° C. and 400 atm. pressure in 70% yield.

Example 10

Ethyl benzene was oxidised by sulphur dioxide in 4 hours to benzoic acid at 275° C. and 1000 atm. pressure in 40% yield.

Example 11

α-Methyl naphthalene was oxidised by sulphur dioxide in 4 hours to α-naphthoic acid in 20% yield at 275° C. and 1000 atm. pressure.

Example 12

Oxidation of 18 g. of styrene at 300° and 1000 atm. pressure of sulphur dioxide for 3 hours resulted in a pressure drop of 300 atm. From 21 g. of crude product 8 g. of benzoic acid were extracted.

What is claimed is:

1. A process for making aromatic carboxylic acids and elemental sulphur which comprises heating to a temperature within the range of 250–350° C., a mixture consisting essentially of sulphur dioxide and an aromatic compound chosen from the group consisting of toluene, xylene, trimethyl benzene, ethyl benzene, benzyl chloride, benzyl alcohol, benzaldehyde, chlorobenzaldehyde, bibenzyl, methyl naphthalene and styrene, at an elevated pressure within the range of 100–400 atmospheres.

2. The process of claim 1 wherein the reaction time is from 1 to 6 hours.

3. The process of claim 1 wherein the aromatic compound is toluene, the pressure is within the range of 275 to 325 atmospheres and the temperature is within the range of 275 to 300° C.

4. The process of claim 1 wherein the aromatic compound is p-xylene, the pressure is within the range of 100 to 200 atmospheres and the temperature is within the range of 275 to 300° C.

5. A process for making trimellitic acid which comprises heating to a temperature within the range of 250°–350° C. a mixture consisting essentially of sulfur dioxide and pseudocumene using a pressure between 100 and 400 atmospheres.

References Cited in the file of this patent

FOREIGN PATENTS 776,161 Great Britain _____ June 5, 1957